3,012,049
ESTER-INTERCHANGE CATALYSTS
John C. Bill, Middlebury, Conn., assignor to United
States Rubber Company, New York, N.Y., a corporation of New Jersey
No Drawing. Filed Sept. 9, 1958, Ser. No. 759,842
9 Claims. (Cl. 260—410.9)

This invention relates to improvements in carboxylic ester-interchange catalysts. More specifically, it relates to the use of hindered phenols as such catalysts.

In the past, ester-interchange reactions have required the use of a strongly acidic or strongly basic catalyst. These prior catalysts have the disadvantage of causing undesirable side reactions. Dehydration, leading to the formation of olefins or aldehydes, is one of the commonest of these side reactions. Residual amounts of prior catalysts contained in polyesters produced in the presence of such catalysts can and do make such polyesters susceptible to hydrolysis in use.

It is an object of this invention to provide an improved type of catalyst for carboxylic ester-interchange reactions. A further object is to speed this type of reaction without simultaneously promoting undesirable side reactions during the reaction or thereafter. Other objects will appear from the following description of this invention.

It has now been found that carboxylic ester-interchange reactions are catalyzed effectively, and without causing undesirable side reactions, by the use of a hindered phenol. Such a phenol is one which contains a substituent in an ortho position. This substituent effectively blocks the phenolic hydroxyl group from entering into the ester-interchange reactions. The boiling point of the hindered phenol selected for catalyzing a particular reaction should be such that, under the reaction conditions, the hindered phenol will remain in the reaction mixture. The amount of the catalyst of this invention to be used suitably ranges from about 0.1 to about 5%, based on the weight of the organic acid present in esterified form in the starting material.

Hindered phenol catalysts which are suitable for the purposes of this invention are represented by the following formulae:

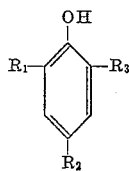

and

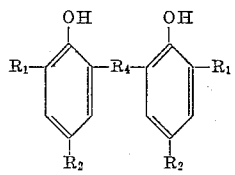

where $R_1$ is an alkyl, cycloalkyl, aralkyl, aryl, alkaryl, alkoxy-aryl, haloaryl, or nitroaryl any 1 group containing at least 4 carbon atoms; $R_2$ and $R_3$ each are hydrogen or halogen atoms, or alkyl, cycloalkyl, aralkyl, aryl, alkaryl, or alkoxy groups; and $R_4$ is an alkylidene group. There is no upper limit on the size of the $R_1$ substituent, but no added advantage is noted when this substituent contains more than about 12 carbon atoms. Exemplary of such phenols are the following:

2,2'-methylene-bis-(4-methyl-6-tert.-butylphenol)
2,2'-methylene-bis-(4-ethyl-6-tert.-butylphenol)
2,4-dinonylphenol
2,6-dinonylphenol
2,4,6-trinonylphenol
2,6-ditert.-butyl-4-methylphenol
2,4-didodecylphenol
2,6-di-cyclohexyl-4-methylphenol
2-cyclohexylphenol
2,2'-methylene-bis-(6-cyclopentylphenol)
2,2'-methylene-bis-(4-methyl-6-cyclopentylphenol)
2-phenylphenol
2,6-diphenyl-4-methylphenol
2,2'-propylene-bis-(4-methyl-6-phenylphenol)
2,4-dinonyl-6-methylphenol
2,4-di-tert.-butyl-6-methylphenol
2-tert.-butylphenol
2-tert.-octyl-4-chlorophenol
2-cyclohexyl-4-methyl-6-chlorophenol
2,6-ditert.-butyl-4-methoxyphenol
2,4-dinonyl-6-benzylphenol
2-(2-methylphenyl)phenol
2-(4-chlorophenyl)phenol
2-(4-nitrophenyl)phenol
2-phenyl-4-isopropylphenol
2,2'-methylene-bis-(4-chloro-6-tert.-butylphenol)
2,2'-methylene-bis-(4-methoxy-6-tert.-amylphenol)
2,2'-isopropylidene-bis-(4,6-ditert.-butylphenol)

Mixtures of hindered phenols of the type described are also satisfactory for fulfilling the purposes of this invention.

The ester-interchange reactions which are speeded by the catalysts of this invention are those in which the starting material and the end product are substantially free from unesterified carboxyl groups. In other words, no carboxylic acids per se are to be included among the starting materials and the end products of the catalyzed reactions. The types of reactions which are so catalyzed are: the interchange of acyl radicals between esters (see Equation I below); alcoholysis (see Equation II below); linear polyester formation (see Equation III below); and alkyd formation (see Equation IV below.)

I. $RCOOR^1 + R^2COOR^3 \rightarrow RCOOR^3 + R^2COOR^1$
II. $RCOOR^1 + R^2OH \rightarrow RCOOR^2 + R^1OH$
III. $nHOROOCR^1COOROH \rightarrow$
$H(OROOCR^1CO)_nOROH + (n-1)HOROH$
IV. $3HOROOCR^1COOROH + 2R^2(OH)_3 \rightarrow$
$HOROOCR^1COOR^2(OH)OOCR^1COOR^2$
$(OH)OOCR^1COOROH + 4HOROH$ In the foregoing equations, the R's, i.e., R through $R^3$, may be aliphatic, cycloaliphatic, aralphatic, aromatic, or alkyl-substituted aromatic hydrocarbon radicals, or such radicals bearing alkoxy and/or halogen substituents. It will be appreciated that Equation IV merely represents a preliminary stage in alkyd resin formation. There are free hydroxyl groups in the polyester product of this equation, and these are capable of reacting by alcoholysis with additional molecules of the starting ester, the end result of these and similar reactions involving other molecules being the formation of high molecular weight, cross-linked alkyd resins.

The foregoing equations are merely exemplary of the types of reactions which are promoted by the catalysts of this invention. The catalyzed reactions include those involving polyhydric alcohols and/or polycarboxylic acid esters having more functional groups than those shown in the above equations. As is known in connection with ester-interchange reactions, these reactions are more apt to go to completion if one of the reaction products is the lowest boiling component of the reaction mixture.

Alcohols which may be used per se or in the form of esters with carboxylic acids in these ester-interchange reactions include: monohydric alcohols, such as methyl, ethyl, isopropyl, sec.-butyl, neopentyl, n-hexyl, n-heptyl, lauryl, cetyl, allyl, crotyl, oleyl, cyclopentyl, cyclohexyl, benzyl, and the like alcohols, as well as non-hindered phenols, such as phenol p-cresol, and the like; glycols, such as ethylene, 1,3-propylene, 1,2-butylene, 2,2-dimethyl-1,3-propylene, hexylene, 1,12-octadecylene, dilinoleyl, diethylene, triethylene, dipropylene, polypropylene, polybutylene, poly-3-chloro-1,2-propylene, cyclopentylene, cyclohexylene and the like glycols; other polyhydroxy compounds, such as glycerol, sorbitol, pentaerythritol, triethanolamine, quercitol, and the like.

Carboxylic acids which may be used in the form of their esters in these ester-interchange reactions include: mono-carboxylic acids, such as acetic, propionic, butyric, valeric, caproic, heptanoic, lauric, stearic, pivalic, acrylic, crotonic, hydrosorbic, undecylenic, oleic, linoleic, linolenic, propiolic, laurolenic, benzoic, hydrocinnamic, benzoylacetic, furoic, p-phenyl benzoic, beta-naphthoic and like acids; dicarboxylic acids, such as succinic, glutaric, adipic, pimelic, suberic, azaleic, sebacic, dilinoleic, maleic, fumaric, apocamphoric, phthalic, terephthalic, diphenic, naphthalene-1,2-dicarboxylic, furalmalonic, and the like acids; and polycarboxylic acids, such as tricarballylic, aconitric, citric, trilinoleic, hemimellitic, and the like acids.

Hydroxy carboxylic acid esters are also suitable starting materials in the reactions catalyzed by the process of this invention. Typical hydroxy acids, to be used in the form of their esters, include glycolic, lactic, hydracrylic, glyceric, ricinoleic, quinec, caffeic, mandelic, tropic, meconic, and the like acids.

The foregoing compounds can be substituted with satisfactory results for corresponding compounds in the following examples. Mixtures of the foregoing compounds can also be used as starting materials in the following and equivalent examples.

The following examples demonstrate the effectiveness of the hindered phenols in shortening the reaction time in ester-interchange reactions. Specific reaction conditions utilized in these examples or in effecting equivalent reactions between other reactants are not part of this invention, since they are well known in this art.

EXAMPLE 1

Three samples of purified methyl stearate (25 gms.; 0.084 mole) were each treated with n-hexyl alcohol (102 gms.; 1.0 mole). To one sample (I), 0.4%, based on the amount of methyl stearate, of 2,2′-methylene bis-(4-methyl-6-tert.-butylphenol) was added as a catalyst. Similarly, 0.4% of 2,6-di-tert.-butyl-4-methylphenol was added to the second sample (II). The third sample (III) was taken as the blank. The three reaction mixtures were heated at 138–140° C. in glass reaction flasks equipped with take-off condensers. The methyl alcohol product from I was completely removed in 4.5 hours; from II, in five hours, and, from uncatalyzed III, in eight hours. The excess n-hexyl alcohol was then removed by distillation, and the amount recovered indicated that one mole of n-hexyl alcohol reacted per mole of methyl stearate in all cases. The product in all cases was a low melting solid, M.P. (uncorr.): 22–4° C. This corresponds to the melting point of n-hexyl stearate. The fact that a considerably shorter time is required for the removal of methyl alcohol in experiments I and II, as compared with experiment III, indicates the catalytic effect of the hindered phenols.

EXAMPLE 2

(a) *Bis-(beta-hydroxyethyl)-adipate formation*

Adipic acid (1 mole) was added slowly to a stirred portion of ethylene glycol (3 moles) while flushing the system with an inert gas. When all of the acid was added, the temperature of the reaction mixture was raised. At a pot temperature of 140° C., water began to distill off and was condensed. The temperature was raised to a maximum of 200° C. until 2 moles of water had been removed and collected. The system was then placed under vacuum, and, with continued heating, ethylene glycol (1 mole) was removed. The product remaining in the reaction flask was the pure bis-ester.

(b) *Polyester formation*

A different catalyst (0.125%, based on the amount of adipic acid present in the bis-ester) was added to each of three portions of the bis-ester, with a fourth portion remaining uncatalyzed. Each portion was stirred and heated (to less than 230° C.), and was maintained under vacuum (water aspirator pump) while an inert gas was bubbled into each reaction mixture. As the reactions progressed, the ethylene glycol formed was distilled off and collected. The reaction cycles are given in Table I along with the physical properties of the poly(ethylene glycol adipate) formed.

TABLE I

| Physical Properties of Ester | Catalyst | | | |
|---|---|---|---|---|
| | None | A | B | C |
| Hydroxyl No. | 72 | 34 | 35 | -------- |
| Acid No. | .7 | .4 | .2 | -------- |
| Molecular weight | 1,550 | 3,250 | 3,200 | 3,100 |
| Cycle time (hours): | | | | |
| steps (a) and (b) | 31 | 20 | 15 | 17 |
| step (b) only | >15 | 4 | -------- | -------- |

A—2,2′-methylene bis-(4-methyl-6-tert.-butylphenol).
B—Mixture of 2,4-dinonylphenol (99%) and 2,4,6-trinonylphenol (1%).
C—2,6-ditert.-butyl-4-methylphenol.

The cycle times obtained here clearly show that the hindered phenols are catalyzing the polyester formation. The overall reaction without catalyst required the most time by a factor of as much as 2.1 to 1, even though the molecular weight of the product obtained without catalyst was much the lowest. The advantage of using the catalyst is much more pronounced when the comparison is made as to step (b) only.

The ineffectiveness of the catalyst in step (a), where a carboxylic acid was among the starting materials, is demonstrated by the following data:

| Time (Hrs.) | Acid Number | |
|---|---|---|
| | No Catalyst | Catalyst A |
| 9 | 7.90 | 7.00 |
| 12 | 5.5 | 6.95 |
| 14 | 3.7 | 3.8 |
| 16 | 2.14 | 1.00 |

No significant difference in reaction rate is noted in this instance, which is in decided contrast to the catalytic effect brought out in Table I.

EXAMPLE 3

Dilinoleic acid (1 mole) was reacted with ethylene glycol (3 moles) in a three-necked flask equipped with stirrer, inert gas inlet, pot thermometer and distillation column with condenser. The reaction mixture was heated, and 2 moles of water were recovered. Catalysts A and B (same as in Example 2) and Compound C (p-nonylphenol) were added separately in amounts of 0.25% by weight of the dilinoleic acid portion of the ester to each of three portions of the dilinoleic acid ester. A fourth portion of the dilinoleic acid ester was uncatalyzed. The several portions were heated, and the ethylene glycol formed was removed under water vacuum. The several reactions were continued until the molecular weight of the polyester formed was approximately 2,000. The time for attaining this molecular weight were, in the case of Catalyst A—10 hours;

Catalyst B—12 hours; Compound C—15 hours; no catalyst—15 hours.

These data demonstrate that much shorter reaction times are required for linear polyester formation when the hindered phenol catalysts are used. It is noteworthy that the non-hindered phenol, p-nonylphenol, did not catalyze this reaction.

EXAMPLE 4

Adipic acid or dilinoleic acid (1 mole), diethylene or triethylene glycol (2.5 moles), and trimethylol ethane, trimethylol propane, or triethanolamine (0.085 mole) were placed in a reactor equipped with stirrer, pot thermometer, nitrogen inlet, and distillation column equipped with vacuum take off. The reaction mixtures were heated and stirred, and nitrogen gas was bubbled into same, until 2 moles of water had been removed. The reaction mixtures were then divided into portions and catalyzed as indicated in Table II below, the amount of catalyst (where used) being 0.125% by weight of the acid portion of the ester at this stage of the reaction. Diethylene or triethylene glycol was removed from each portion under water pump vacuum, heat, and stirring until the molecular weight of the resulting alkyd resins was approximately 2,000. The times required for attaining this molecular weight are presented in Table II.

TABLE II

| Alkyd Resin Prepared From— | | | Catalyst | Time (hrs.) to Mol. Wt. of 2,000±100 |
| --- | --- | --- | --- | --- |
| Acid | Glycol | Triol | | |
| Dilinoleic | Triethylene | Trimethylol propane | None | 18–20 |
| Do | do | do | A | 10 |
| Do | do | Trimethylol ethane | A | 10–12 |
| Do | Diethylene | Triethanol amine | A | 12 |
| Adipic | do | Trimethylol ethane | None | 30–36 |
| Do | do | do | p-toluene sulfonic acid.[1] | 18–20 |
| Do | do | do | A | 14–16 |
| Do | Triethylene | do | A | 16 |
| Do | Diethylene | do | B | 16 |

[1] Product of this reaction contained aldehydes (a precipitate of the dinitrophenyl hydrazone formed when the reaction product was tested for aldehydes) and olefins (as shown by the fact that the reaction product discharged the color of bromine water). These side reaction products were not present when a hindered phenol was used as the catalyst.

Note: Catalysts A and B were the same as in Example 2. Where data are not presented on reactions conducted in the absence of catalyst, the indicated molecular weight had not been attained at the end of a period at least twice as long as the period listed for the corresponding catalyzed reaction.

The data of Table II clearly show the catalytic effect of the hindered phenols on the several ester-interchange reactions reported therein for alkyd resin production. It is of interest that the strong acid catalyst, p-toluene sulfonic acid, was not as effective a catalyst as the hindered phenols, and also caused the formation of undesired by-products.

EXAMPLE 5

Reaction of methyl benzoate with 1,4-butanediol: methyl benzoate (2 moles) was heated (100°–130° C.) in a distillation apparatus (6 inch Vigreaux column) with 1,4-butanediol (1 mole). 20 hours were required to distill off 2 moles of methanol (acid number was less than 1). The same reaction was carried out with .125 wt. percent of catalyst A (per Example 2) present. The time required in this case was 16 hours. This again demonstrates the catalytic effect of a hindered phenol.

EXAMPLE 6

Methyl stearate (1 mole) and dodecyl acetate (1 mole), together with 0.5% (based on the weight of the organic acids present in these esters) of 2,6-dicyclohexyl-4-methylphenol, were heated (70°–80° C.) in a distillation apparatus. Methyl acetate (0.95 mole) was distilled off and recovered. Good quality dodecyl stearate remained in the reaction vessel. This reaction was repeated without catalyst. The difference in reaction times with and without catalyst favored the catalyzed reaction by a factor of about 1:3.

EXAMPLE 7

The results as to time differential noted in Example 6 were also obtained in the reaction of ethylene glycol diacetate (3 moles) with methyl maleate (2 moles), the catalyst used being 2,6-diphenyl-4-methylphenol (0.5%). The overhead product was methyl acetate, while the other product was poly-(ethylene glycol maleate).

A useful test for demonstrating the presence of hindered phenols is the phosphomolybdic acid test. The sample (1 drop) is dissolved in 1–5 cc. of ethanol. One drop of phosphomolybdic acid (1%) in ethanol is added. To this is added one drop of conc. ammonium hydroxide. If a hindered phenol is present, a blue color is developed. This test was reported by Platkonskaya, J. App. Chem. (U.S.S.R.), 10, 202 (1937); C.A. 31, 4232 (1937). The final reaction mixtures, obtained in the hindered phenol-catalyzed reactions of all examples, responded to this test, proving that the hindered phenols were not consumed in the reactions but were present to exert their catalytic effect throughout the reaction period.

This application is a continuation-in-part of application Serial No. 576,763, filed April 9, 1956, now abandoned.

The hindered phenols are effective catalysts for ester-interchange reactions in which the starting material and end product are substantially free from unesterified carboxylic groups. The use of the catalysts of this invention permits a decided shortening of the reaction times required for carrying these reactions to the desired stage of completion. The catalysts of this invention are effective without causing undesirable side-reactions during the reaction or thereafter, such as are caused by previously known catalysts.

Having thus described my invention, what I claim and desire to protect by Letters Patent is:

1. In a carboxylic ester-interchange reaction in which the starting material and end product are substantially free from unesterified carboxyl groups, the improvement which consists in effecting said reaction in the presence of a catalyst consisting of a phenol selected from the class consisting of compounds represented by the formulae:

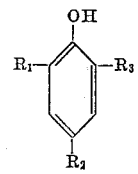

and

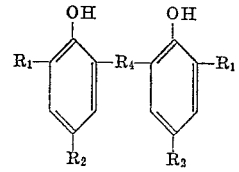

where $R_1$ is a member selected from the class consisting of alkyl, cycloalkyl, aralkyl, aryl and alkaryl radicals containing at least 4 carbon atoms; $R_2$ and $R_3$ each is a member selected from the class consisting of hydrogen, alkyl, cycloalkyl, aralkyl, aryl and alkaryl radicals; and $R_4$ is an alkylidene group.

2. The reaction of claim 1, in which said catalyst is 2,2'-methylene-bis-(4-methyl-6-tert.-butylphenol).

3. The reaction of claim 1, in which said catalyst is 2,6-di-tert.-butyl-4-methylphenol.

4. The reaction of claim 1, in which said catalyst is 2,4-di-nonylphenol.

5. In a carboxylic ester-interchange reaction in which the starting material and end product are substantially free from unesterified carboxyl groups, the improvement which consists in effecting said reaction in the presence of a catalyst consisting of a phenol represented by the formula:

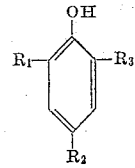

where $R_1$ is an alkyl radical containing at least four carbon atoms; and $R_2$ and $R_3$ each is an alkyl radical.

6. In a carboxylic ester-interchange reaction in which the starting material and end product are substantially free from unesterified carboxyl groups, the improvement which consists in effecting said reaction in the presence of a catalyst consisting of a phenol represented by the formula:

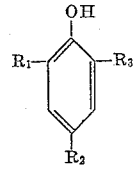

where $R_1$ is an alkyl radical containing at least four carbon atoms; $R_2$ is an alkyl group; and $R_3$ is hydrogen.

7. In a carboxylic ester-interchange reaction in which the starting material and end product are substantially free from unesterified carboxyl groups, the improvement which consists in effecting said reaction in the presence of a catalyst consisting of a phenol represented by the formula:

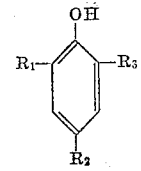

where $R_1$ is a cycloalkyl radical containing at least four carbon atoms; $R_2$ is an alkyl radical; and $R_3$ is a cycloalkyl radical.

8. In a carboxylic ester-interchange reaction in which the starting material and end product are substantially free from unesterified carboxyl groups, the improvement which consists in effecting said reaction in the presence of a catalyst consisting of a phenol represented by the formula:

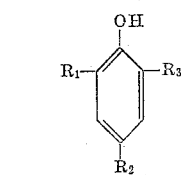

where $R_1$ and $R_3$ each is an aryl radical; and $R_2$ is an alkyl radical.

9. In a carboxylic ester-interchange reaction in which the starting material and end product are substantially free from unesterified carboxyl groups, the improvement which consists in effecting said reaction in the presence of a catalyst consisting of a phenol represented by the formula:

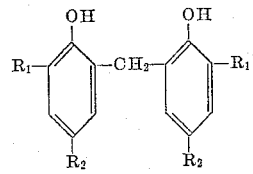

where $R_1$ and $R_2$ each is an alkyl radical.

References Cited in the file of this patent

UNITED STATES PATENTS

| | | |
|---|---|---|
| 2,678,935 | Sundberg et al. | May 18, 1954 |
| 2,790,826 | Bader | Apr. 30, 1957 |